Sept. 15, 1931.    W. S. BAYLIS    1,823,230
METHOD OF RESTORING MOISTURE AND ADDING ACID TO REACTIVATED CLAY
Filed Jan. 3, 1928
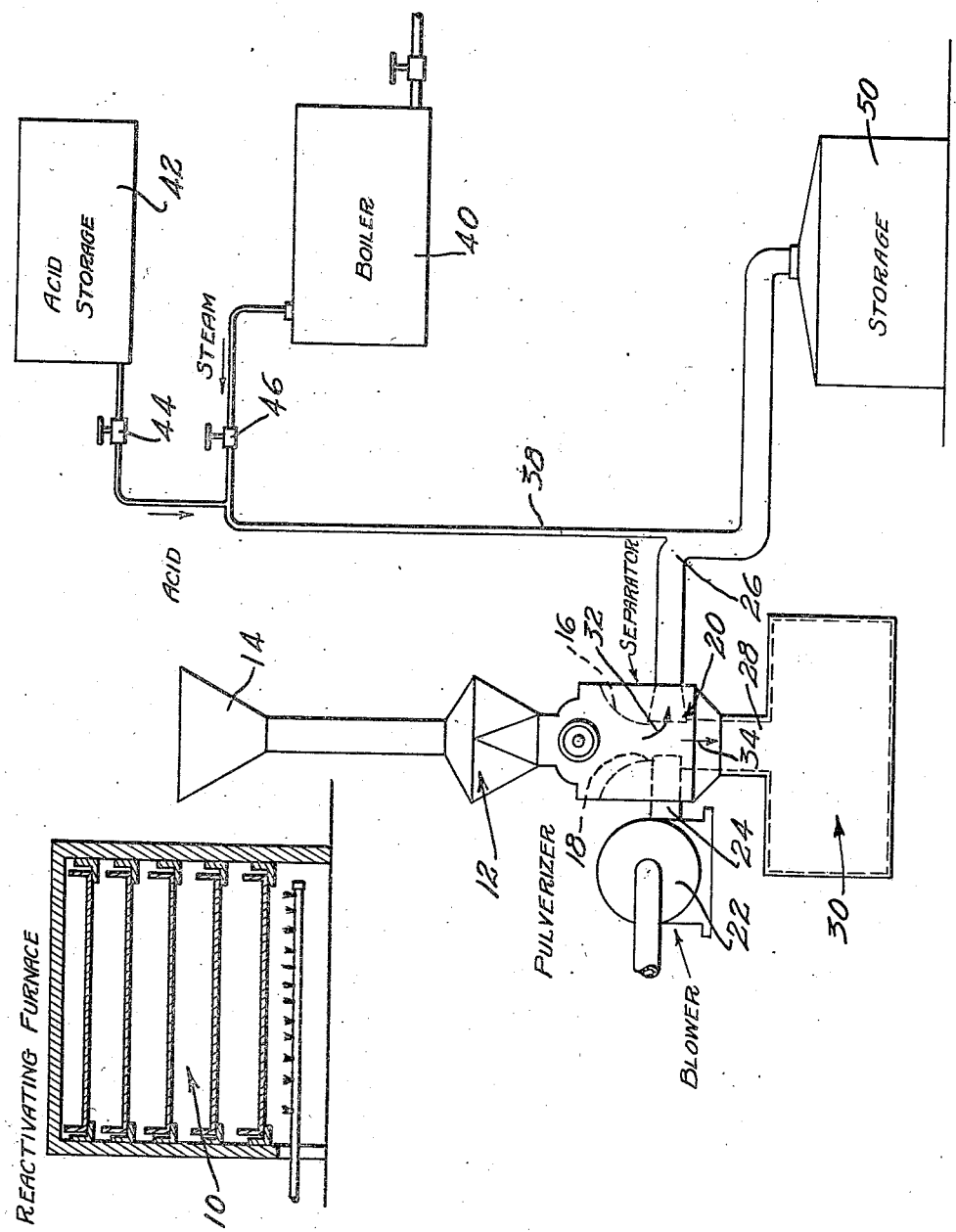
INVENTOR:
WALTER S. BAYLIS,
BY
ATTORNEY.

Patented Sept. 15, 1931

1,823,230

UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, OF LOS ANGELES, CALIFORNIA, A CORPORATION OF CALIFORNIA

METHOD OF RESTORING MOISTURE AND ADDING ACID TO REACTIVATED CLAY

Application filed January 3, 1928. Serial No. 244,348.

This invention relates to the preparation of chemically activated clay for treatment of certain materials, and it relates particularly to a method whereby used activated clay may be reactivated and prepared for reuse.

Activated clay is made from a raw earth by a process which involves chemical treatment to remove the impurities. The chemical reacts with the clay or the impurities carried thereby, and after the clay has been washed a chemically inert activated clay is procured. In the treatment of certain materials such as lubricating oils, it is found that better results are obtained when free acid is mixed with the chemically inert activated clay. When the activated clay is reactivated, the impurities collected therein and the acid, a portion of which has been spent, are burned out. Consequently when the reactivated clay is again used on these substances, the treatment is not as good as before.

One of the important objects of the present invention is to provide a method of reactivating and adding additional free acid to a spent activated clay.

It is found that when treating certain classes of materials which are refined by clay at high temperature, for example lubricating stocks, the freeing of the impurities is assisted by moisture in the activated clay, this moisture assisting in vaporization. When a spent clay has been reactivated, it is comparatively dry and because of its dryness is not as satisfactory for treating the class of materials now being considered.

It is accordingly one of the objects of the invention to provide a method of reactivating and adding moisture to an activated clay.

A further object of the invention is to provide a method of reactivating and adding free acid and moisture to a reactivated clay.

Other objects and advantages of the invention may be made evident hereinafter.

It is well known that either a natural clay or an activated clay loses its properties of decolorizing, or otherwise suitably acting on certain materials, with continued use. Processes of roasting this spent clay to reactivate it have been devised. Certain clays, however, are mixed with water, and in some cases acid, in order to give them certain valuable properties. In reactivating such clays, this moisture, together with the acid and impurities gathered by the continued use of the clay, are removed. I have discovered a process by which it is possible to again add moisture and acid to the clay after it has been roasted in a reactivating furnace.

My invention may conveniently be carried out by the use of apparatus such as is illustrated in the drawing. Referring to this drawing, the numeral 10 represents a reactivating furnace. This furnace may be of any type suitable for the reactivation of natural or activated clays so often used in the art as decolorizing agents, or for other purposes such as the treatment of oils previously mentioned.

In the event that the reactivated clay forms into lumps in the furnace 10, it is necessary to pulverize this clay. This is accomplished by a pulverizer 12 fed by a hopper 14. Such a pulverizer is, of course, unnecessary if the reactivated clay coming from the furnace is already finely divided.

From the pulverizer 12, the reactivated clay drops into a hopper 16 which guides it into a throat 18 of a suitable separator 20. Directed across this throat is a stream of air supplied by a blower 22 connected to the throat 18 by a pipe 24. Directly opposite the pipe 24, and also communicating with the throat 18, is a discharge pipe 26 which is adapted to receive the stream of air from the pipe 24. This air carries the finer particles of the reactivated clay into the discharge pipe 26, the heavier particles being heavy enough to drop through the stream of air directed across the throat 18 from the pipe 24. These heavier particles drop through a pipe 28 into a suitable storage 30. Thus the lighter particles follow a path indicated by an arrow 32, while the heavier particles follow a path indicated by an arrow 34. The separator 20 may be of any conventional design, so long as it separates the heavier particles and the lighter particles, and conveys these lighter particles through the discharge pipe 26.

Communicating with the interior of the discharge pipe is a pipe 38 which is adapted to carry either steam from a boiler 40 or a suitable acid from an acid storage 42 or a mixture of the two. The amount of steam and acid supplied to the discharge pipe 26 through the pipe 38 is controlled by valves 46 and 44. I have found that substances such as steam, acid, or a mixture of steam and acid, will readily combine with the activated clay being conveyed through the discharge pipe 26 by means of the air from the blower 22 if this steam or acid is suitably injected into the air-stream carrying the particles. It is, however, within the scope of my invention to introduce the steam and acid into the discharge pipe 26 by any suitable means such as a high velocity nozzle, an agitator, etc., as long as a very thorough mixture of the clay with the steam and acid takes place.

The reactivated clay after coming into intimate contact with the steam, acid, or a mixture of the two, is in a condition for use in such processes as treating lubricating or other oils, etc., and is conducted by the discharge pipe 26 into a suitable storage 50. As previously brought out, the clay as it comes from the furnace 10 is dry and the acid which may have been previously therein has burned, making the reactivated clay unfit for certain uses. By mixing a new supply of moisture and acid with the reactivated clay in the manner disclosed, this clay is in a condition equal in effectiveness to the original condition of the acid-treated clay. Such a reactivation, of course, effects numerous economies in permitting the continued use of the same clay.

My method is not limited to the mixing of acid and steam with the reactivated clay, but may find equally important applications in introducing any other substance into this clay.

I claim as my invention:

1. A method of adding activating fluids to a reactivated clay, comprising: separating the smaller particles from the larger particles of said reactivated clay; and introducing said activating fluids into an air stream carrying said smaller particles.

2. A method of adding activating fluids to a reactivated clay, comprising: introducing said activating fluids into an air stream carrying particles of said reactivated clay.

3. A method of adding activating fluids to a reactivated clay, comprising: pulverizing said activated clay; carrying said pulverized clay in an air stream; and introducing said activating fluids into said air stream.

4. A method of adding acid to an activated clay, comprising: pulverizing said activated clay; mixing said acid with steam; introducing said mixture into a stream of air carrying particles of said activated clay; allowing the steam to condense; and then separating the clay and a substantial part of the moisture from the air.

5. A method of reactivating clay, comprising: the steps of heat treating activated clay to substantially eliminate the impurities collected therein, separating the adsorbent from the relatively nonadsorbent particles of the reactivated clay and introducing acid into the air stream carrying said adsorbent particles.

6. A method of treating reactivated clay, comprising: the steps of separating the relatively adsorbent from the relatively nonadsorbent particles of clay and introducing acid into an air stream carrying the relatively adsorbent particles.

7. A method of treating reactivated clay, comprising: the steps of pulverizing said reactivated clay into particles, separating the smaller particles from the larger particles of said reactivated clay by an air blast and introducing activating fluid into the air blast carrying the thus separated smaller particles.

8. A method of adding acid to activated clay, comprising: injecting acid and steam into a stream of air carrying particles of said activated clay.

In testimony whereof, I have hereunto set my hand at New York, New York, this 16 day of December, 1927.

WALTER S. BAYLIS.